No. 832,350. PATENTED OCT. 2, 1906.
T. J. THORP.
HARROW.
APPLICATION FILED APR. 23, 1906.
2 SHEETS—SHEET 2.
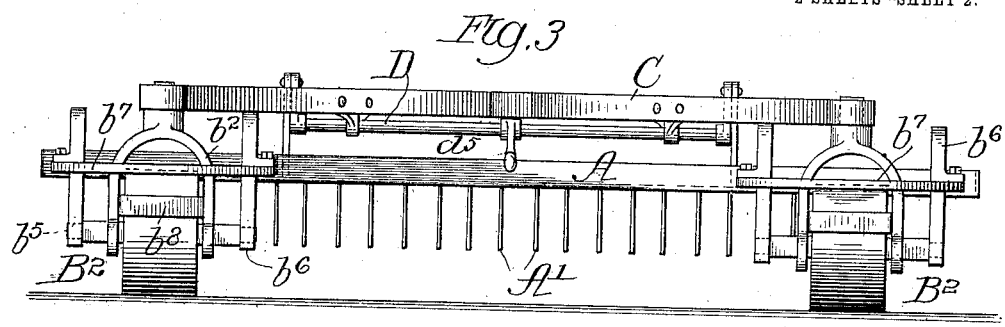
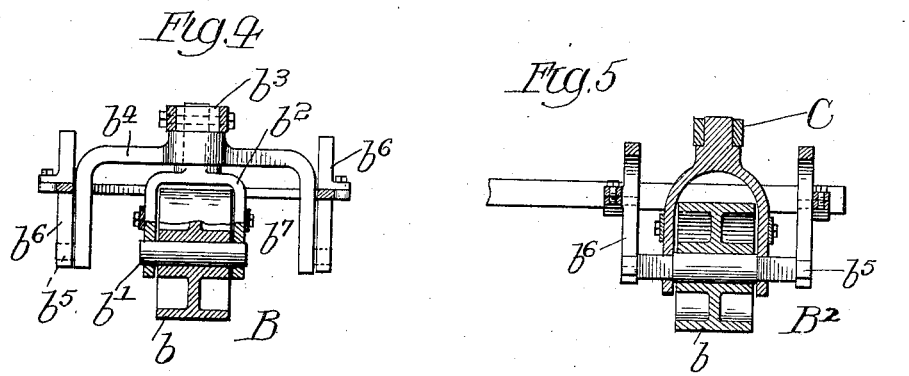
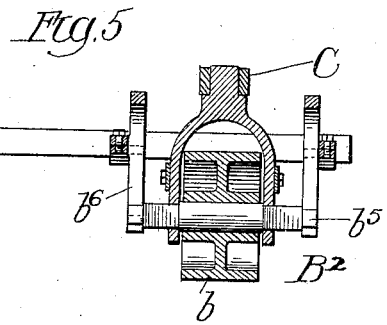
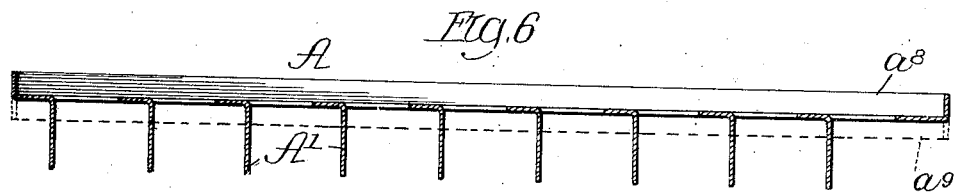
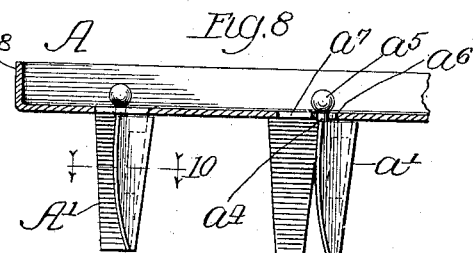
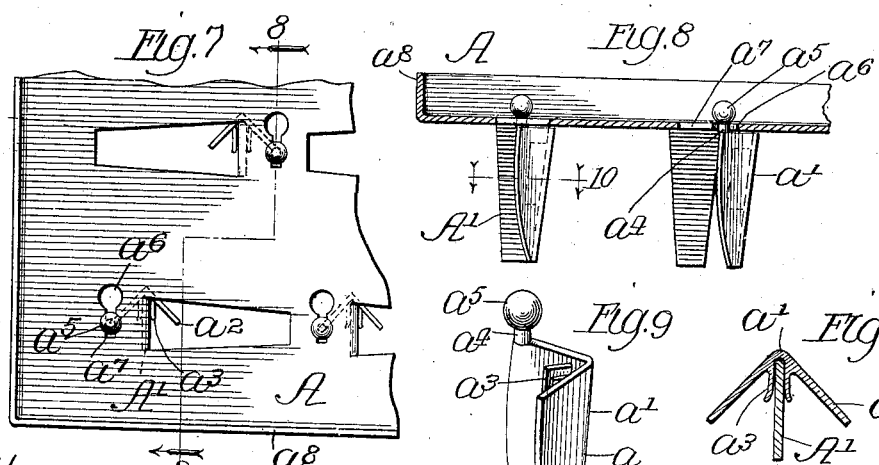
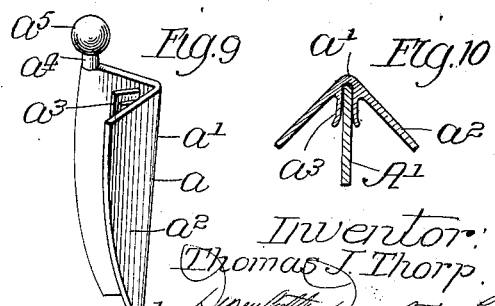
Witnesses
Inventor:
Thomas J. Thorp
by his Attys

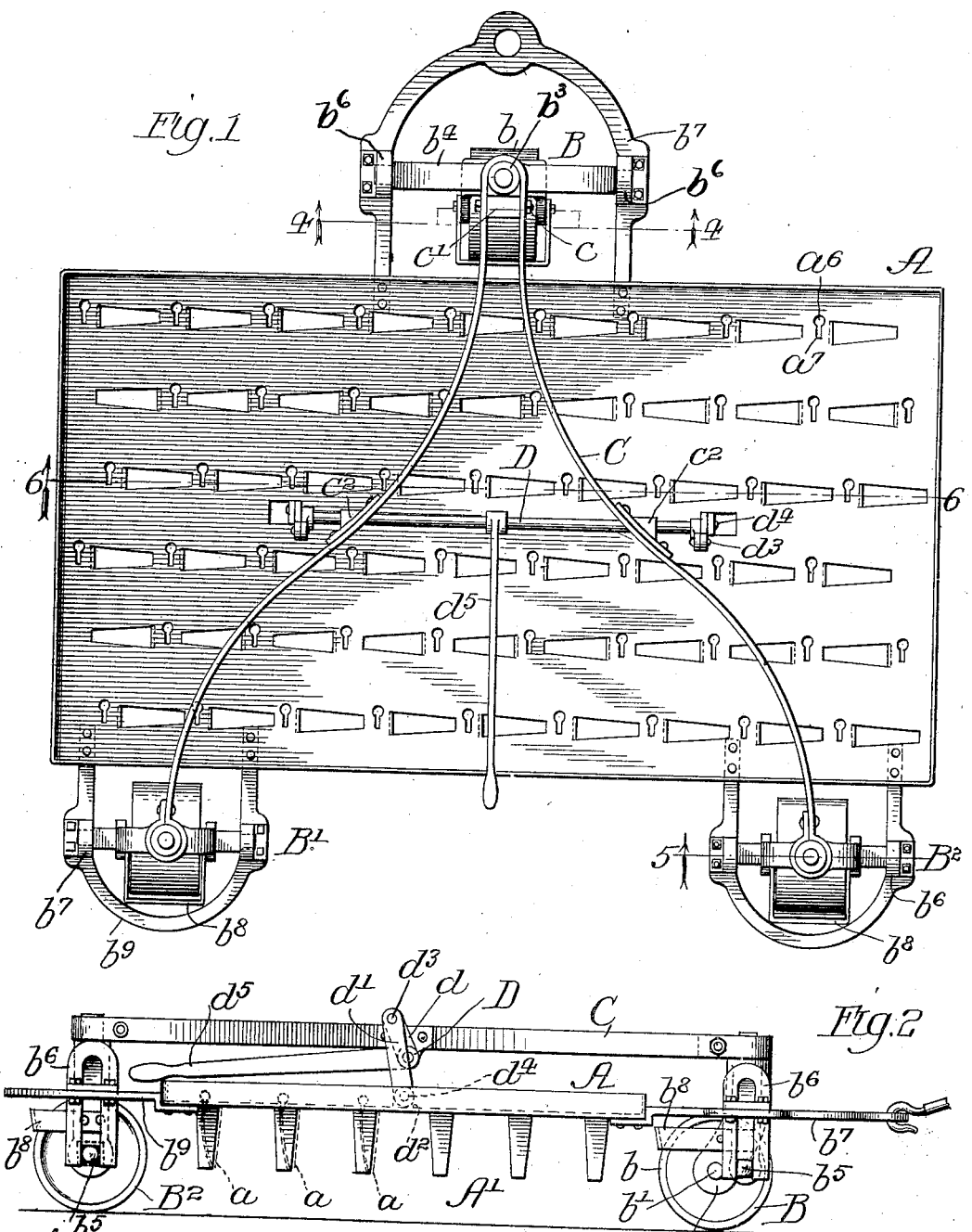

UNITED STATES PATENT OFFICE.

THOMAS J. THORP, OF CORVALLIS, OREGON, ASSIGNOR TO T. J. THORP MANUFACTURING COMPANY, OF CORVALLIS, OREGON, A CORPORATION OF OREGON.

HARROW.

No. 832,350.

Specification of Letters Patent.

Patented Oct. 2, 1906.

Application filed April 23, 1906. Serial No. 313,336.

*To all whom it may concern:*

Be it known that I, THOMAS J. THORP, a citizen of the United States, residing at Corvallis, in the county of Benton and State of Oregon, have invented a new and useful Improvement in Harrows, of which the following is a specification.

My invention relates particularly to wheeled harrows, although certain features of the invention are applicable to any construction of harrow.

My primary object is to provide a harrow of improved construction and operation which can be manufactured at very low cost.

The invention is illustrated in the accompanying drawings, in which—

Figure 1 is a plan view of my improved harrow; Fig. 2, a side elevational view of the same; Fig. 3, a rear elevational view of the same; Fig. 4, a sectional view taken as indicated at line 4 of Fig. 1; Fig. 5, a sectional view taken as indicated at line 5 of Fig. 1; Fig. 6, a sectional view taken as indicated at line 6 of Fig. 1; Fig. 7, a broken view showing, on an enlarged scale, a portion of the harrow and illustrating the use of cultivator-teeth in connection with the regular harrow-teeth; Fig. 8, a section taken as indicated at line 8 of Fig. 7; Fig. 9, a perspective view of a cultivator tooth or share adapted to fit upon the regular harrow-tooth, and Fig. 10 a section taken as indicated at line 10 of Fig. 8.

The harrow preferably comprises a sheet-metal body A, having teeth A' formed integrally therewith by punching the metal downwardly; a caster B, connected with the front portion of the harrow-body; casters B' B², connected with the rear portion of the harrow-body; a frame C, supported on said casters; and a rock-shaft D, journaled on the frame C, from which the harrow-body is suspended.

The teeth are preferably somewhat pointed, as shown, and are struck downwardly from the metal of the body in such manner that the edges of the teeth are presented forward. I provide for use in connection with the regular harrow-teeth cultivator-teeth or shovels $a$. Each member $a$ has a forwardly-presented ridge $a'$, from which diverge rearwardly wings $a^2$. Within the angle of each member $a$ is provided a socket $a^3$, adapted to engage a harrow-tooth, as best shown in Fig. 10. One wing of each member $a$ is provided at its upper free corner with a stud $a^4$, having a head $a^5$. The harrow-body is provided with a series of openings $a^6$, from which slots $a^7$ extend rearwardly. The heads $a^5$ are adapted to pass through the openings $a^6$, and the shanks or studs $a^4$ are adapted to move into the slots $a^7$ when the member $a$ is shoved rearwardly to bring the socket $a^3$ into engagement with the harrow-teeth. In Fig. 8 one of the cultivator-shovels is shown in full engagement with a harrow-tooth, and another of the cultivator-shovels is shown in position ready to be shoved back into full engagement with the harrow-tooth. I have shown the edges of the sheet-metal body turned upwardly to form a strengthening-flange $a^8$, as indicated in full lines in Fig. 6. If desired, the flange may be turned downwardly, as indicated at the dotted lines $a^9$ in Fig. 6. In such case the flange will act as a leveler, and there is less liability of dirt collecting on the top of the harrow-body.

The caster B has a roller $b$, provided with a journal $b'$, which supports a fork $b^2$, swiveled in the stem $b^3$ of a yoke-form member $b^4$, whose arms are provided with outturned studs $b^5$, upon which move the guides $b^6$ of a frame member $b^7$, which is rigidly connected with the front margin of the harrow-body. As indicated in Fig. 1, the journal of the caster is somewhat in the rear of the swiveled stem of the caster, so that the caster will turn freely when the harrow is being turned about. The member $b^7$ forms the draft member of the harrow. The yoke $b^2$ is equipped with a mud-guard $b^8$, adapted to clean the wheel $b$. The construction at the rear casters is practically the same as that described, and the parts are designated by the same reference-letters. The rear casters, as shown, however, differ in one particular from the front caster—namely, in the particular that the journal of the caster is directly beneath the swiveled stem of the caster-yoke, it being unnecessary to make the same provision for turning of the wheel-frame of the caster as is made at the front of the harrow. The rear casters have their guides $b^6$ supported on members $b^9$, rigidly connected with the rear margin of the harrow-body near the lateral edges of the body.

The frame C may be simply formed by bending a steel bar between its ends to embrace the stem of the front caster and curving the members of the steel bar, as shown, the rear ends of said members being formed into eyes encircling the stems of the rear casters. The members of the steel bar when thus bent are connected in the rear of the stem of the front caster by a bolt $c$, which passes through said members and through a spacing-block $c'$. The members of the steel bar are provided intermediately with bearings $c^2$, in which the rock-shaft D is journaled.

The rock-shaft D is equipped at its ends with cranks $d$, which are connected by links $d'$ to lugs $d^2$, stamped upwardly from the body of the harrow. The links are connected with the arms by pivots $d^3$ and with the lugs $d^2$ by pivots $d^4$. The shaft is provided near the center of its length with an operating-lever $d^5$. It will now be understood that when the rock-shaft is turned in the direction indicated by the arrow in Fig. 2 the harrow-body will be lowered to the working position.

By preference the alternate transverse rows of teeth are formed by having the metal struck down in such manner that the big end of the openings in one row is in one direction and the big end of the openings in the next row is in the other direction. This provides against undue weakening of the metal forming the body. Of course it will be understood that it may be practicable in many instances to lighten the harrow by punching out metal from the body. It may be stated, however, that a stronger and lighter harrow than the harrows now known may be produced at a cheaper cost by using the improved construction. It will be understood, of course, that the harrow-body and its teeth are formed by the aid of suitable powerful presses thoroughly adapted to do the work.

It may be remarked that the foregoing detailed description has been given for clearness of understanding only and that no undue limitation is to be understood therefrom.

What I regard as new, and desire to secure by Letters Patent, is—

1. A harrow, comprising a sheet-metal body and teeth of integral construction formed by punching metal downwardly, and cultivator-shovels detachably connected with said teeth.

2. A harrow, comprising a sheet-metal body with teeth struck downwardly therefrom, said body having sockets for detachable cultivator-shovels, and detachable cultivator-shovels having sockets engaging said harrow-teeth and shanks engaging the sockets in said body.

3. A harrow, comprising a body and harrow-teeth depending therefrom, and detachable cultivator-shovels connected with said harrow-teeth.

4. A harrow, comprising a body equipped with teeth, front and rear casters, guides on the harrow-body and connected with the casters, a frame supported from the casters, and lifting means connecting said frame to the harrow-body.

5. A harrow, comprising a body equipped with suitable teeth, a member projecting forwardly from said body and equipped with guides, a member connected with said guides, a front caster journaled in said last-named member, rear members connected with the harrow-body and equipped with guides, members connected with said last-named guides, casters connected with said last-named members, a frame supported from said casters, and a rock-shaft journaled on said frame and connected with the harrow-body.

6. A harrow, comprising a body equipped with teeth, members rigidly connected therewith and equipped with guides, casters connected with said guides, a frame supported on said casters, a rock-shaft supported on an intermediate portion of said frame and equipped with a lever, cranks connected with said rock-shaft, and links connecting said cranks with said body, for the purpose set forth.

THOMAS J. THORP.

In presence of—
L. HEISLAR,
J. H. LANDES.